US006505191B1

(12) United States Patent
Baclawski

(10) Patent No.: US 6,505,191 B1
(45) Date of Patent: *Jan. 7, 2003

(54) DISTRIBUTED COMPUTER DATABASE SYSTEM AND METHOD EMPLOYING HYPERTEXT LINKAGE ANALYSIS

(75) Inventor: Kenneth P. Baclawski, Waltham, MA (US)

(73) Assignee: Jarg Corporation, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/359,982

(22) Filed: Jul. 23, 1999

Related U.S. Application Data

(60) Provisional application No. 60/094,112, filed on Jul. 24, 1998, and provisional application No. 60/094,110, filed on Jul. 24, 1998.

(51) Int. Cl.[7] .................................................. G06F 17/30
(52) U.S. Cl. .................................. 707/3; 2/5; 2/10; 2/4
(58) Field of Search ............................ 707/2, 3, 6, 10, 707/4, 5

(56) References Cited

U.S. PATENT DOCUMENTS

| 5,226,176 A | 7/1993 | Westaway et al. |
| 5,537,467 A | 7/1996 | Cheng et al. |
| 5,647,058 A | 7/1997 | Agrawal et al. |

(List continued on next page.)

FOREIGN PATENT DOCUMENTS

| EP | 0 882 503 A | 2/1998 |

OTHER PUBLICATIONS

Santini, et al.; "Similarity Queries In Image Databases"; Proceedings 1996 IEEE Computer Society Conference on Computer Vision and Pattern Recogniation (Cat. No. 96CB35909), Proceedings of IEEE Conference on Computer Vision and Pattern Recognition, San Francisco, CA, USA; 18–20 Jun. 1996; pp. 646–651; XP002127209; 1996, Los Alamitos, CA, USA, IEEE Computer Society Press, USA ISBN: 0–8186–7258–7 *Section 2.1.2*.

(List continued on next page.)

Primary Examiner—Jean M. Corrielus
(74) Attorney, Agent, or Firm—Kudirka & Jobse, LLP

(57) ABSTRACT

A distributed computer database system includes one or more front end computers, one or more home nodes, one or more index nodes and one or more object nodes interconnected by a network into a search engine for retrieval of hypertext documents. A query from a user is transmitted to one of the front end computers, which forwards the query to one of the home nodes, of the search engine. The home node parses the query into one or more elementary queries and schedules the elementary queries for processing. Each elementary query can be one of a number of types, including an index query, a link query or an object query. To process an index query or link query, the home node extracts features from the index query or link query, fragments the extracted features into feature fragments, and hashes these features. Each hashed feature fragment is transmitted to one index node on the network. Each index node on the network that receives a hashed feature fragment uses the hashed feature fragment of the index query or link query to perform a search on its respective partition of the database. The results of the searches of the local databases are gathered by the home node. To process an object query, the home node transmits the object identifier contained in the object query to the object node on the network containing the information associated with the object. The object node that receives the object query uses the object identifier to perform a search on its respective partition of the database. The results of the search of the local database are transmitted to the home node. The home node processes the results for each elementary query according to the specifications in the query. When all processing is completed by the home node, the results are returned to the front end node, which formats the results for presentation to the user.

30 Claims, 10 Drawing Sheets

U.S. PATENT DOCUMENTS

| | | | |
|---|---|---|---|
| 5,655,080 | A | 8/1997 | Dias et al. |
| 5,694,593 | A | 12/1997 | Baclawski |
| 5,727,950 | A | 3/1998 | Cook et al. |
| 5,794,210 | A | 8/1998 | Goldhaber et al. |
| 5,809,492 | A | 9/1998 | Murray et al. |
| 5,819,243 | A | 10/1998 | Rich et al. |
| 5,855,008 | A | 12/1998 | Goldhaber et al. |
| 5,926,551 | A | 7/1999 | Dwork et al. |
| 5,931,907 | A | 8/1999 | Davies et al. |
| 5,936,547 | A | 8/1999 | Lund |
| 5,953,726 | A | 9/1999 | Carter et al. |

OTHER PUBLICATIONS

Salton, Gerard et al., "Automatic Structuring And Retrieval Of Large Text Files", Communications Of The ACM, Feb. 1994, pp. 97–108, vol. 37, No. 2.

Chakrabarti, Soumen, et al., "Automatic Resource Compilation by Analyzing Hyperlink Structure and Associated Text", Proceedings $7^{th}$ International World <http://decweb.ethz.ch/WWW7/1898/com1898.htm>.

Jain, Ranesh, "Content–Centric Computing in Visual Systems", in Del Bimbo, Alberto, "Image Analysis and Processing", Lecture Notes in Computer Science, 9th International Conference ICIAP '97, Sep., 1997, pp. 1–31, Proceedings, vol. II, Florence, Italy.

Pirolli, Peter et al., "Silk from a Sow's Ear: Extracting Ususable Structures From the Web", CHI 96, Apr. 13–18, 1996, pp. 118–125, Vancouver, Canada.

Kleinberg, Jon, "Authoritative Sources in Hyperlinked Environment", Proceedings 9th ACM–SIAM Symposium on Discrete Algorithms, 1998, <http://www.cs.cornell.edu/home/kleinber/auth.pdf>.

Gibson, David et al, "Inferring Web Communities from Link Topology", Proceedings 9th ACM Conference on Hypertext and Hypermedia, 1998, <http://www.cs.cornell.edu/home/kleinber/ht98.pdf>.

Arocena, Gustavo et al., "Applications of a Web Query Language", Hyper Proceedings, Sixth International World Web Conference, LaTeX2 translator Version 96.1, (Feb. 5, 1996), Nikos Drakos, Computer Based Learning Unit, University of Leeds.

Weiss, Ron et al., "HyPursuit: A Hierarchical Network Search Engine That Exploits Content–Link Hypertext Clustering", Hypertext '96, pp. 180–193, Washington, DC, USA.

Rivlin,Ehud et al., "Navigating in Hyperspace: Designing a Structure–Based Toolbox", Communications Of The ACM, pp. 87–97, Feb. 1994, vol. 37, No. 2.

Tversky, Amos et al., "Features of Similarity", Psychological Review, The American Psychological Association, Inc., Jul. 1977, pp. 327–352, vol. 84, No. 4.

White, Howard, "Bibliometrics", Annual Review of Information Science and Technology, pp. 119–186, vol. 24, 1989, Elsevier Science Publishers B.V.

Spertus,Ellen, "ParaSite: Mining Structural Information on the Web", Hyper Proceedings, Sixth International World Wide Conference, <http://decweb.ethz.ch/WWW6/Technical/Paper206/Paper206htm;>.

Noy, Natalya Fridman, "Knowledge Representation for Intelligent Information Retrieval in Experimental Sciences", Ph.D. Thesis, Northeastern University, Dec. 1997, pp. 2–67.

Rivest,R., "The MD4 Message Digest Algorithm", Request for Comments: 1186, MIT Laboratory for Computer Science, pp. 1–18, Oct. 1990.

Ohta, Yuichi, "Knowledge–Based Inerpretation of Outdoor Natural Color Scenes", Institute of Information Sciences and Electronics, University of Tsukuba, pp. 1–90, Ibaraki 305, Japan.

Fikes, Richard, "Ontologies: What are They, and Where's The Research?", KR'96, Proceedings of the Fifth International Conference, Nov. 5–8, 1996, pp. 652–664.

Santini, Simone, et al., "Image Databases Are Not Databases With Images", in Delbimbo, Alberto, "Image Analysis and Processing", Lecture Notes in Computer Science, 9th International Conference ICIAP '97, Sep. 1997, pp. 38–45, 356–427, Proceedings, vol. II, Florence, Italy.

Salton, Gerard, "Automatic Indexing", Automatic Text Processing: The Transformation, Analysis, and Retreval of Information by Computer, 1989, pp. 275–366, Addison–Wesley Publishing Co.

Hurwicz, Mike, "Take Your Data to the Cleaners", Byte Magazine, CMP Media Inc., Jan., 1997, <http://www.byte.com>.

Weldon, Jay–Louise, et al., "Data Warehouse Building Blocks", Byte Magazine, CMP Media Inc., Jan., 1997, <http://www.byte.com>.

Weiss, Sholom, et al., "What Is Data Mining?", Predictive Data Mining, A Practical Guide, Morgan Kaufmann Publishers, Inc., 1998, pp. 1–58.

Zloof, Moshe M., "Query–By–Example: The Invocation and Definition of Tables and Forms", IBM Thomas J. Watson Research Center, Yorktown Heights, NY.

Wooldridge, Michael, et al., "Intelligent Agents: Theory and Practice", The Knowledge Engineering Review, vol. 10:2, 1995, 115–152.

Campbell, Alistair E., et al., "Algorithms for Ontologiecal Mediation", Department of Computer Science and Center for Cognitive Science, State University of New York at Buffalo, Buffalo, NY.

Baclawski, Kenneth, "An Abstract Model For Semantically Rich Information Retrieval", Northeastern University, College of Computer Science, Boston, MA Mar. 30, 1994.

Giger, H.P., "Concept Based Retrieval in Classical IR Systems", Proceedings of the International Conference on Research and Development in Information Retrieval, NY, NY, ACM, vol. CONF. 11, p. 275–289.

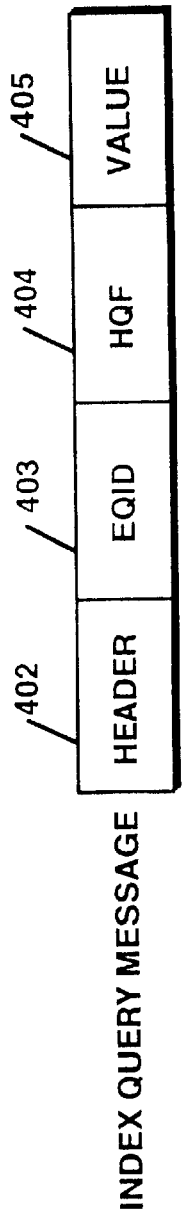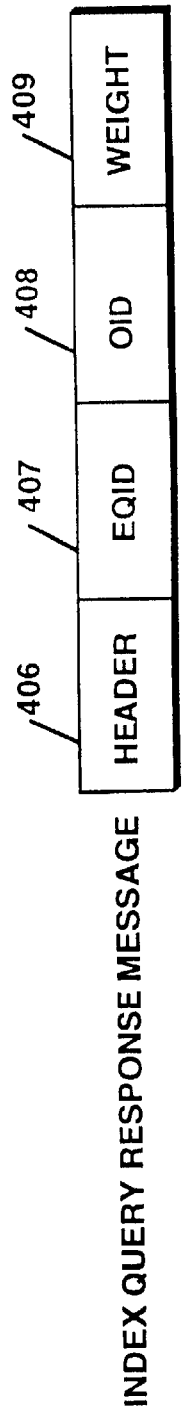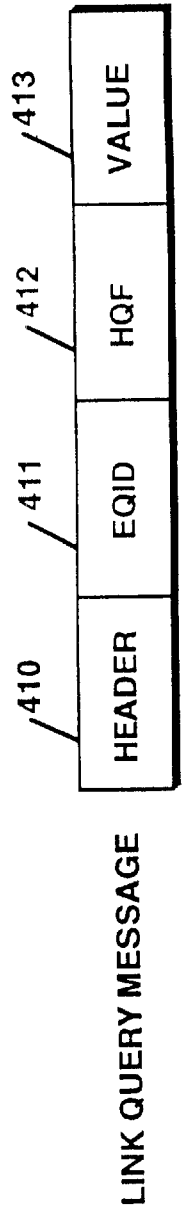

LINK QUERY RESPONSE MESSAGE

OBJECT QUERY MESSAGE

OBJECT QUERY RESPONSE MESSAGE

INSERT INDEX MESSAGE: HEADER (428), OID (429), HQF (430), VALUE (431)

INSERT LINK MESSAGE: HEADER (432), OID1 (433), OID2 (434), HQF (435), VALUE (436)

INSERT OBJECT MESSAGE: HEADER (437), OID (438), LOCATION (439), FEATURES (440), ... (441)

DISTRIBUTED COMPUTER DATABASE SYSTEM AND METHOD EMPLOYING HYPERTEXT LINKAGE ANALYSIS

RELATED APPLICATIONS

This application is related to and claims priority from copending, commonly assigned U.S. Provisional Application, Ser. No. 60/094,112, filed Jul. 24, 1998 by Kenneth P. Baclawski, and entitled "Hypertext Linkage Analysis System and Method; and Ser. No. 60/094,110, filed Jul. 24, 1998 by Kenneth P. Baclawski, and entitled "Distributed Object Search System and Method"; the disclosures of which are incorporated herein by reference. This application is also related to copending, commonly assigned U.S. application, Ser. No. 09/509,328, filed on even date herewith by Kenneth P. Baclawski, and entitled "Distributed Computer Database System And Method For Performing Object Search", the disclosure of which is incorporated herein by reference.

FIELD OF THE INVENTION

The invention relates to computer database systems and more specifically to distributed computer database systems.

BACKGROUND OF THE INVENTION

The World Wide Web (WWW) is much more than just a collection of Web pages. Each page contains references to other pages. Such references are called links, and one of the most important features of a Web browser is the ability to follow a link and display the page that is being referenced. A collection of documents linked together in this way is called a hypertext.

The link structure of a hypertext is a rich source of knowledge about the content of the hypertext. In the field of bibliometrics, links in the form of citations have been used for understanding documents by using citation analysis techniques. The link structure of the WWW is now being exploited as a means of categorization and knowledge extraction. This is being done in two ways:

1. General hypertext query languages.
2. Cluster analysis algorithms.

A Web query language, such as WebSQL, is a query language for extracting information from the Web, based on hypertext structure as well as content. For example, one might be interested in a job opportunity for a librarian. One can query the Web using WebSQL to find all pages containing the keywords "employment" or "job opportunities" and then list all the pages referenced by such a page and containing the keyword "librarian."

Cluster analysis algorithms make use of Web query languages to find specific patterns in the link structure of the WWW. The most common cluster analysis pattern is the authority/hub pattern. To compute this pattern, one first specifies a topic area using one or more keywords. For example, one might be interested in the topic "knowledge management". A page is potentially relevant if it contains one or more keywords of the topic. An authority page for a topic is a page that is referenced by a large number of pages potentially relevant to the topic. Note that an authority page need not contain any of the keywords of the topic. Authority is conferred on it by virtue of being referenced frequently by potentially relevant pages. A hub page for a topic is one that references a large number of pages potentially relevant to the topic. An authority page for knowledge management is one that is highly referenced by pages that mention knowledge management. If one is interested in knowledge management, then it seems natural to look first at the authority pages.

Web query languages in general, and Web cluster analysis algorithms in particular, are limited in an important respect. They can only evaluate outgoing links, not incoming links. This is due to the way that Web links are defined. A link within one page specifies the page to which it linked, not the other way around. For example, suppose that one was interested in all the pages that refer to one's own home page. WebSQL cannot answer such a query.

The WWW is not just a hypertext. Pages can contain images, sound and video streams, and the structure of the WWW is continually changing. For these reasons, the WWW is called a hypermedia environment. Web resources are located by a Universal Resource Locator (URL) which uniquely identifies the resource. More generally, a hypermedia environment consists of information objects that are uniquely identified by an object identifier (OID) and that can contain links to other information objects. A hypermedia environment is also called an object database.

To assist in finding information in an object database, special search structures are employed called indexes. Large databases require correspondingly large index structures to maintain pointers to the stored data. Such an index structure can be larger than the database itself. Current technology requires a separate index for each attribute or feature. This technology can be extended to allow for indexing a small number of attributes or features in a single index structure, but this technology does not function well when there are hundreds or thousands of attributes. Furthermore, there is considerable overhead associated with maintaining an index structure. This limits the number of attributes or features that can be indexed. Current systems are unable to scale up to support databases for which there are: many object types; millions of features; queries that involve many object types and features simultaneously; and new object types and features being continually added.

Further information can be had regarding the foregoing concepts with reference to the following publications:

1 L. Aiello, J. Doyle, and S. Shapiro, editors. *Proc. Fifth Intern. Conf. on Principles of Knowledge Representation and Reasoning*. Morgan Kaufman Publishers, San Mateo, Calif., 1996.

2 G. Arocena, A. Mendeizon, and G. Mihaila. Applications of a web query language. In *Proc. 6 Intern. World Wide Web Conf.*, 1997.

3 K. Baclawski. Distributed computer database system and method, December 1997. U.S. Pat. No. 5,694,593. Assigned to Northeastern University, Boston, Mass.

4 S. Chakrabarti, B. Dom, D. Gibson, J. Kleinberg, P. Raghavan, and S. Rajagopalan. Automatic resource list compilation by analyzing hyperlink structure and associated text. In *Proc. 7 Intern. World Wide Web Conf.*, 1998.

5 A. Del Bimbo, editor. *The Ninth International Conference on Image Analysis and Processing*, volume 1311. Springer, September 1997.

6 N. Fridman Noy. *Knowledge Representation for Intelligent Information Retrieval in Experimental Sciences*. PhD thesis, College of Computer Science, Northeastern University, Boston, Mass., 1997.

7 D. Gibson, J. Kleinberg, and P. Raghavan. Inferring Web communities from link topology. In *Proc. 9 ACM Conf. on Hypertext and Hypermedia*, 1998.

8 R. Jain. Content-centric computing in visual systems. In *The Ninth International Conference on Image Analysis and Processing, Volume II*, pages 1–13, September 1997.

9 J. Kleinberg. Authoritative sources in a hyperlinked environment. In *Proc. ACM-SIAM Sympos. on Discrete Algorithms*, 1998.

10 Y. Ohta. *Knowledge-Based Interpretation of Outdoor Natural Color Scenes.* Pitman, Boston, Mass., 1985.
11 P. Pirolli, J. Pitkow, and R. Rao. Silk from a sow's ear: Extracting usable structures from the web. In *CHI'96 Proceedings: Conference on Human Factors in Computing Systems: Common Ground,* pages 118–125, Vancouver, BC, 1996.
12 E. Riviin, R. Botafogo, and B. Schneiderman. Navigating in hyperspace: Designing a structure-based toolbox. *Comm. of the ACM,* 37(2):87–96, February 1994.
13 G. Salton. *Automatic Text Processing.* Addison-Wesley, Reading, Mass., 1989.
14 G. Salton, J. Allen, and C. Buckley. Automatic structuring and retrieval of large text files. *Comm. ACM,* 37(2):97–108, February 1994.
15 E. Spertus. ParaSite: Mining structural information on the web. In *Proc. 6 Intern. World Wide Web Conf.,* 1997.
16 A. Tversky. Features of similarity. *Psychological review,* 84(4):327–352, July 1977.
17 R. Weiss, B. Velez, M. Sheldon, C. Nemprempre, P. Szilagyi, and C. Giffor. HyPursuit: A hierarchical network search engine that exploits content-link hypertext clustering. In *Proc. Seventh ACM Conf. on Hypertext,* pages 180–193, 1996.
18 H. White and K. McCain. Bibliometrics. *Ann. Rev. Info. Sci. and Technology,* pages 119–186, 1989.

The disclosures of the publications referenced in this "Background of the Invention" are incorporated herein by reference.

It would be desirable to provide an information retrieval system that can retrieve link and other information from a unified database of word and non-word based information, including documents, images and other forms of multimedia, using a single indexing system, and otherwise overcome many of the performance and other problems and limitations of current systems. Such information retrieval systems preferably would be highly scalable, versatile, robust and economical.

SUMMARY OF THE INVENTION

The present invention resides in an indexing and search engine for extraction of information based on the content of information objects in a database as well as links between information objects. Unlike Web query languages such as WebSQL, the present invention supports queries directed at retrieving information with respect to either outgoing or incoming links, or both. For example, the present invention can be implemented to determine all the pages that refer to one's own home page.

Hypertext query languages and algorithms that make use of them, such as cluster algorithms, depend on the retrieval of three kinds of information in an object database: (1) Retrieval of objects relevant to a query, as typically provided in conventional information retrieval systems; (2) Retrieval of link information relevant to a query; and (2) Retrieval of all link information for a specific object relevant to a query, including both incoming and outgoing links.

For providing such retrieval, the invention refines the types of queries that users can submit. Accordingly, a general query is composed of a number of elementary queries each corresponding to a kind of information retrieval:

index query
An elementary query for retrieval of information objects relevant to a query.
link query
An elementary query for retrieval of link information relevant to a query.
object query
An elementary query for retrieval of link information relevant to a query for a specific object, including both incoming and outgoing links.

In a first aspect of the invention, a computerized information retrieval system can be provided for processing a query for word based and non-word based retrieval of information from a database, which has a first mechanism for parsing a query into a plurality of elementary queries each including one of an index query and a link query; a second mechanism for extracting a number of features from each of the elementary queries; a third mechanism for fragmenting each of the features into feature fragments; a fourth mechanism for hashing each of the feature fragments into hashed feature fragments; and a fifth mechanism for using each of the hashed feature fragment in accessing a corresponding hash table for obtaining an object identifier therefrom for use in obtaining information from the database relevant to the elementary queries, including information relevant to the index queries and link information relevant to the link queries.

In another aspect of the invention, an information indexing system can be provided for indexing information for facilitated retrieval from a database, which has a first mechanism for extracting a number of features from an information object, each of the features comprising one of an index feature and a link feature; a second mechanism for fragmenting each of the features into feature fragments; a third mechanism for hashing each of the feature fragments into hashed feature fragments; and a fourth mechanism for using each of the feature fragments in accessing a corresponding hash table that identifies a location at which data is to be stored, the data including (i) an object identifier if the feature of the information object comprises an object feature, and (ii) an object identifier of an object referenced by a link specified by the link feature if the feature of the information object comprises a link feature.

More specifically, a distributed computer database system implementing the invention includes one or more front end computers, one or more home nodes, one or more index nodes and one or more object nodes interconnected by a network into a search engine for retrieval of hypertext documents. A query from a user is transmitted to one of the front end computers, which forwards the query to one of the home nodes, of the search engine. The home node parses the query into one or more elementary queries and schedules the elementary queries for processing. Each elementary query can be one of a number of types, including an index query, a link query or an object query. To process an index query or link query, the home node extracts features from the index query or link query, fragments the extracted features into feature fragments, and hashes these features. Each hashed feature fragment is transmitted to one index node on the network. Each index node on the network that receives a hashed feature fragment uses the hashed feature fragment of the index query or link query to perform a search on its respective partition of the database. The results of the searches of the local databases are gathered by the home node. To process an object query, the home node transmits the object identifier contained in the object query to the object node on the network containing the information associated with the object. The object node that receives the object query uses the object identifier to perform a search on its respective partition of the database. The results of the search of the local database are transmitted to the home node. The home node processes the results for each elementary query according to the specifications in the query. The processing may include evaluation of additional elementary queries. When all processing is completed by the home node, the results are returned to the front end node which formats the results for presentation to the user.

In another embodiment of the invention, a distributed computer database system includes one or more front end computers, one or more home nodes, one or more index nodes and one or more object nodes interconnected by a network. A single computer processor can fulfill the functionality of one or more front end, home, index and object nodes. The combination of computer nodes interconnected by a network operates as a search engine. A user wishing to query the database, transmits the query to one of the front end nodes which in turn forwards the query to one of the home nodes of the network. The node receiving the query, termed the home node of this query, parses the query into elementary queries. For an index or link query, the home node extracts the features of the received query, fragments the features into feature fragments and then encodes the feature fragments using a hash function. A portion of each hashed feature fragment is used by the home node as an addressing index by which the home node transmits the hashed index or link query feature to an index node on the network specified by that fragment portion. For an object query, the home node uses a portion of the OID as an addressing index by which the home node transmits the object query to an object node on the network. Each index node on the network that receives a hashed index or link query feature fragment uses the hashed index or link query feature fragment to perform a search on its respective database. Index nodes finding data corresponding to a hashed index query feature fragment return the set of OIDs of the information objects possessing this feature. Index nodes finding data corresponding to a hashed link query feature fragment return the set of pairs of OIDs of the links between information objects which possess this feature fragment. Each object node on the network that receives an object query uses the OID contained in the object query to perform a search on its respective database. The object node returns the information associated with the OID as specified in the object query. Such information may include any or all of the following: the location of the object whose OID is contained in the object query, the set of OIDs that represent objects referenced by the object whose OID is contained in the object query, the set of OIDs that represent objects that reference the object whose OID is contained in the object query, and other auxiliary information associated with the object whose OID is contained in the object query. The OIDs or pairs of OIDs are then gathered by the home node. For an index or link query, a similarity function is computed based on the features that are in common with the index or link query. The similarity function is used to rank the objects or links between objects. The objects or links between objects that have the largest similarity value are used in subsequent processing of the query. For an object query, the information returned by the object node is used in subsequent processing of the query. The subsequent processing of the query by the home node may involve the construction of new elementary queries using the information returned from earlier elementary queries. Processing continues until no additional elementary queries are needed. The home node then performs any remaining processing required by the query, and the results are transmitted to the front-end node. The front end node formats the response to the user based on the OIDs and any other information transmitted by the home node. For example, if the front end node is a World Wide Web server, then the front end node constructs a page in HTML format containing a reference to a URL and auxiliary information for each object. The front end transmits the formatted response to the user.

BRIEF DESCRIPTION OF THE DRAWINGS

The above and further advantages of the invention may be better understood by referring to the following description in conjunction with the accompanying drawings in which:

FIG. 4a–FIG. 4i are block diagrams showing formats for a query message, query response message, object message, object response message, insert message, and insert object message, respectively, as may be used in conjunction with the embodiment of FIG. 2 and FIG. 3;

DETAILED DESCRIPTION OF A PREFERRED EMBODIMENT

At the outset it may prove useful to describe ontology in more detail because indexing of an object database requires an ontology. An ontology models knowledge within a particular domain. An ontology can include a set of specifications setting forth a concept network, specialized vocabulary, syntactic forms and inference rules for the particular domain represented by the database. Ontologies in general may include some or all of the following: vocabulary terms and term recognizers, conceptual categories, category classifications, relationships between conceptual categories, weight information that determines the strength of a relationship, syntactic forms for expressing these relationships, and logical inferences for relationships. In particular, an ontology specifies the features that information objects can possess as well as how to extract features from objects. The extracted features are used for determining the degree of similarity between a query object and an information object in an object database. Each feature of an information object may have an associated weight, representing the strength of the feature or the degree with which the object has the feature. For a relational database, the ontology is specified by its database schema, which consists of the attributes of the records along with the types of the attribute values.

Figure 1:
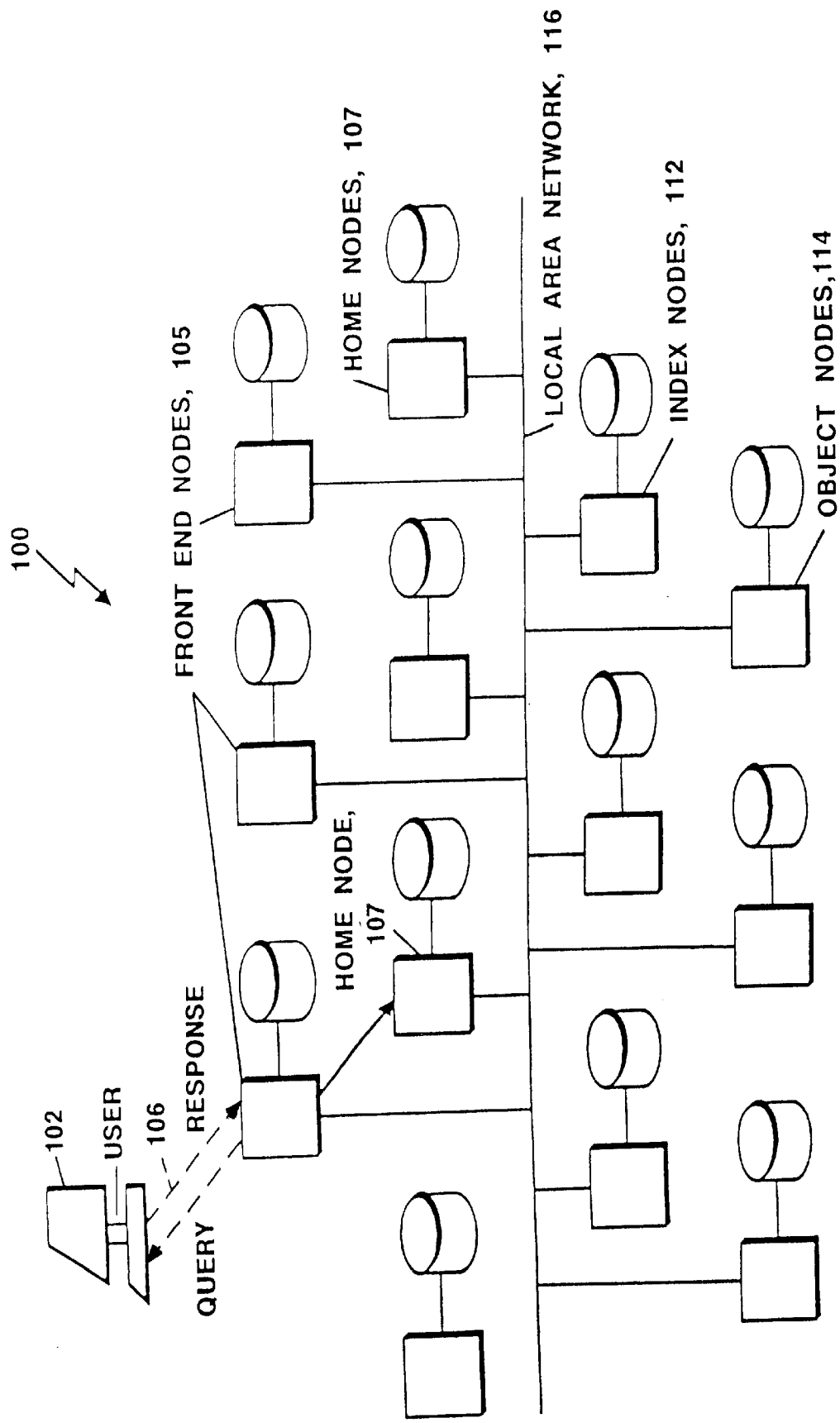
FIG. 1 is a block diagram of an embodiment of the distributed computer database system in accordance with the invention.

Referring now to FIG. 1, in broad overview, one embodiment of a distributed computer database system 100 of the invention includes a user computer 102 that is in communication with a front end computer 105, e.g., through a network 106. The front end computer 105, which may also be the user computer, is in turn in communication with a search engine which includes one or more computer nodes 107, 112, 114 interconnected by a local area network 116. The individual computer nodes 107, 112, 114 may include local disks, or may, alternatively or additionally, obtain data from a network disk server (not shown).

The computer nodes 107, 112, 114 of the search engine may be of several types, including home nodes 107, index nodes 112, and object nodes 114. The nodes 107, 112, 114 of the search engine need not represent distinct computers. In one embodiment, the search engine is composed of a single computer that takes on the roles of all home nodes 107, index nodes 112, and object nodes 114. In another embodiment, the search engine is composed of separate computers for each home node 107, index node 112, and object node 114. Those skilled in the art will realize many variations are possible which will still be within the scope and spirit of the present invention.

Figure 2:
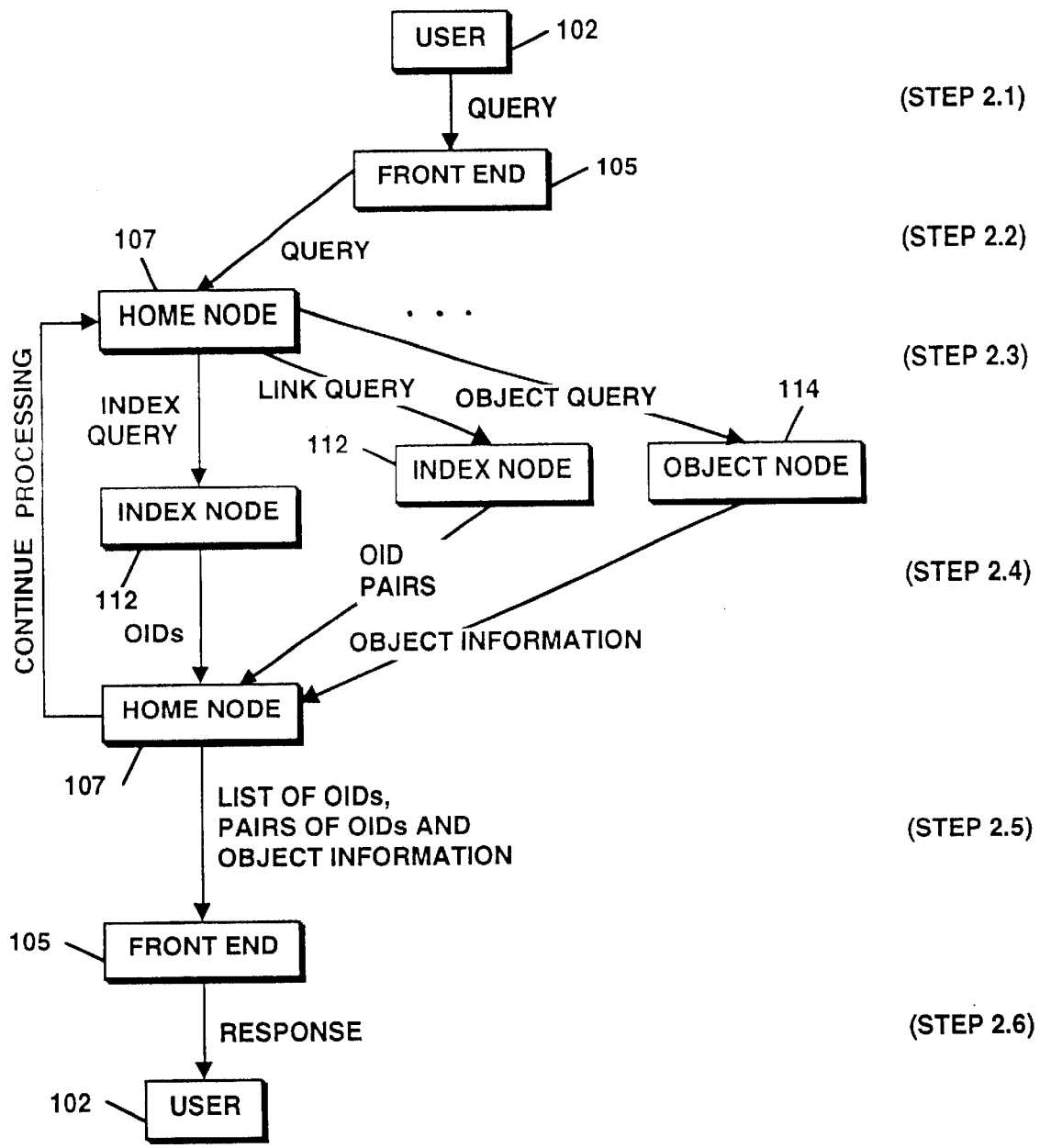
FIG. 2 is a block diagram of the distributed computer database system of FIG. 1 in flow chart form, which illustrates a method of processing queries and returning results in accordance with an embodiment of the invention.

Considering the processing of a query first, and referring also to FIG. 2, in one embodiment when a user transmits (Step 201) a query from the user computer 102, the front end computer 105 receives the query. The front end computer 105 is responsible for establishing the connection with the user computer 102 to enable the user to transmit a query and to receive a response in an appropriate format. The front end computer 105 is also responsible for any authentication and administrative functionality. In one embodiment, the front end computer 105 is a World Wide Web server communicating with the user computer using the HTTP protocol.

After verifying that the query is acceptable, the front end computer 105 performs any reformatting necessary to make the query compatible with the requirements of the search engine. The front end computer 105 then transmits the query to one of the home nodes 107 of the search engine (Step 202), which is then defined as the home node of the search engine for that query.

The home node 107 parses the query into a series of elementary queries. Elementary queries are of three kinds: index queries, link queries and object queries. Each elementary query is composed of a command that determines what action the elementary query is to perform and additional information that depends on the kind of elementary query. An object query contains an OID, and the other two kinds of elementary query contain an information object conforming to the ontology of the object database. A link query contains exactly one link to an unspecified information object. An index query preferably does not contain any unspecified links to other information objects.

The purpose of an object query is to obtain information about the object identified by the OID of the object query. The purpose of an index query is to search for information objects that contain information similar to the information in the index query. The purpose of a link query is to search for pairs of information objects such that one object contains information similar to the information in the link query and such that this information is associated with a link to the other information object.

The home node 107 extracts information from each elementary query depending on what kind of elementary query it is. The home node 107 extracts the OID from an object query. The home node 107 extracts features from an index query or a link query according to the ontology.

Features are extracted from structured elementary queries or documents by parsing the document to produce a data structure, then dividing this data structure into (possibly overlapping) substructures called fragments. Fragments of an elementary query feature are used to find matching fragments in the database, so they are also called probes.

Features are extracted from unstructured documents by using feature extraction algorithms, e.g., implemented as computer programs executable by the home node 215. Feature extraction produces a data structure consisting of a collection of inter-related component data structures. The data structure is divided into (possibly overlapping) substructures, as in the case of a structured document, and these substructures are the fragments of the unstructured document. A large variety of feature extraction algorithms have been developed for media such as sound, images and video streams, for example, edge detection, segmentation and object classification algorithms for images. Fourier and Wavelet transformations as well as many filtering algorithms are also used to extract features from images and sound. Video streams comprise a sequence of images and a synchronized sound track. In addition to feature extraction from the individual images and sound track, video streams can be organized into scenes; domain objects in successive images can be identified with one another and domain objects of the sound track can be related to domain objects in the corresponding scenes. Features extracted from video streams can also include these domain objects. Each feature can have one or more values associated with components of the data structure that represents the feature. In the simplest case the data structure consists of a single component with an associated value. In this case, the feature represents one attribute of the object. More complex features will contain several inter-related components, each of which may have attribute values. The data structures that represent the features conform to a data model specified by the ontology. The data model determines the kinds of components and attribute values that are allowed. Each fragment of each feature has an associated weight, representing the strength of the feature or degree to which the information object possesses the feature.

If a fragment occurs very commonly in the database, then it can not contribute to the purpose of the search engine; namely, distinguishing those objects that are similar to a particular query. An example is the brightness of an image. The possible values of such a fragment will be partitioned into a collection of contiguous, non-overlapping ranges of the values. Each range of the value is then regarded as a separate fragment. When the fragments of a query are extracted, fragments that represent value ranges near, but not including, the value of the fragment in the query can also be included as fragments of the query, but with smaller weights than the fragment representing a value range that includes the value of the fragment in the query. The value ranges for a particular fragment can either be specified explicitly in the ontology, or they can be constructed dynamically as objects are indexed by the search engine.

The home node 105 encodes each fragment of the query by using a predefined hashing function. Data in the distributed computer database system was previously stored locally on the various index nodes 112 using this hashing function to generate an index to the data in the local database. In particular, if a fragment includes a link then it is hashed and stored as a link fragment, while if a fragment does not include a link then it is hashed and stored as an index fragment. Thus, the use of the same hashing function to generate an index for data storage and to generate hashed probes for a query assures that 1. data is distributed uniformly over the index nodes of the search engine during the storing of data and
2. the probes are scattered uniformly over the index nodes during the processing of a query.

In one embodiment, the hash value resulting from the use of the hashing function has a first portion which serves to identify the index node 112 to which the data is to be sent to be stored or to which a query feature fragment is to be sent as a probe and a second portion which is the local index value which is used to determine where data is to be stored at or retrieved from the index node 112. Thus, in terms of an index or link query, the hashed query features fragments are distributed (Step 203) as probes to certain index nodes 112 of the search engine, as determined by the first portion of the hash value.

In one embodiment, the OID of an object query has a first portion which serves to identify the object node 114 to which the data is to be sent to be stored or to which an OID is to be sent as a probe and a second portion which is the local index value which is used to identify the storage locations at which data is to be stored or from which data is to be retrieved from the object node 114 (Step 203).

Index nodes 112 whose hashed feature fragments match the index feature fragments by which the data was initially stored on that index node respond to the elementary query by transmitting (Step 204) the OIDs matching the index terms of the requested information to the home node 107. Thus all matches between the hashed probes and the local hash table of index terms are returned or gathered to the home node 107 that initially transmitted the elementary query.

Index nodes 112 whose hashed feature fragments match the link feature fragments by which the data was initially stored on that index node respond to the elementary query by transmitting (Step 204) a set of pairs of OIDs matching the link terms of the requested information to the home node 105. Each pair of OIDs represents a link from the first OID in the pair to the second OID in the pair. Thus all matches between the link feature fragments and the local hash table of link terms are returned or gathered to the home node 107 that initially transmitted the elementary query.

Object nodes 114 whose OIDs match the OIDs by which the data was initially stored on that object node respond to the object query by transmitting (Step 204) information about the object and a set of OIDs associated with the OID of the requested object query to the home node 107. Each transmitted OID represents an object for which there is an incoming or outgoing link with the OID of the object query.

The home node 107 then processes the results of each elementary query. The action is determined by the command contained in the elementary query. For an object query, the command may require selecting a subset of the OIDs according to criteria such as the directionality or type of the link.

For an index or link query, the command may require that the information returned to the home node 107 be ranked and selected according to their relevance. This determination of relevance is made by the home node by comparing the degree of similarity between the query and the objects whose OIDs were returned. In one embodiment the measure of similarity between the query and the object is a cosine measure and is given by the expression COS(v,w), where the vector v denotes the query and the vector w denotes the object. These vectors are in a space in which each feature represents one dimension of the space.

Another commonly used measure of similarity between two objects is a distance function in the same space mentioned above for the cosine measure. However, there is convincing evidence that human similarity does not satisfy the axioms of a distance function. The model that currently seems to be the most successful approach is the Feature Contrast Model of Tversky, referenced above. In this model, the similarity between a query and an object is determined by three terms:

1. The features that are common to the query and the object.
2. The features of the query that are not features of the object.
3. The features of the object that are not features of the query.

The first term contributes a positive number to the similarity value, while the second and third terms have negative contributions. In addition the second and third terms are multiplied by predefined constants such that a feature in the second and third set has less effect on the similarity than one in the first set.

In one embodiment the measure of similarity between the query and the object is a measure determined by two predefined constants that are used to multiply the first two terms occurring in the Feature Contrast Model. In this embodiment, the predefined constant for the third term is assumed to be zero. Since the third term is the least important, it has only a small effect on the ranking of the objects that are retrieved.

In one embodiment the N objects with the highest similarity are returned. In another embodiment all objects which generate similarity values greater than a predetermined value are considered sufficiently similar to the query to be returned to the user as relevant information.

Once the similarity is determined, the home node 107 orders the objects according to their degree of similarity and then determines a list of the most relevant objects. The result of an elementary query depends on the kind of elementary query. For an index query the result is a list of OIDs. For a link query the result is a list of pairs of OIDs. For an object query the result is object information, possibly including a list of OIDs. The result list of an elementary query may be used in two ways depending on how the elementary query was related to other elementary queries when the original query was parsed. The result may be used for subsequent processing of other elementary queries, or it may be used as part of the information to be returned, or both. If it is used for subsequent processing of other elementary queries, these other elementary queries are processed as described above.

When all elementary queries have been processed, the results are collected for return to the user. In one embodiment the returned information is transmitted to the front end computer 105 (Step 205), which formats the response appropriately and transmits the response to the user computer 102 (Step 206). In another embodiment the information to be returned is transmitted directly to the user computer 102 by way of the network without the intervention of the front end computer.

Figure 3:
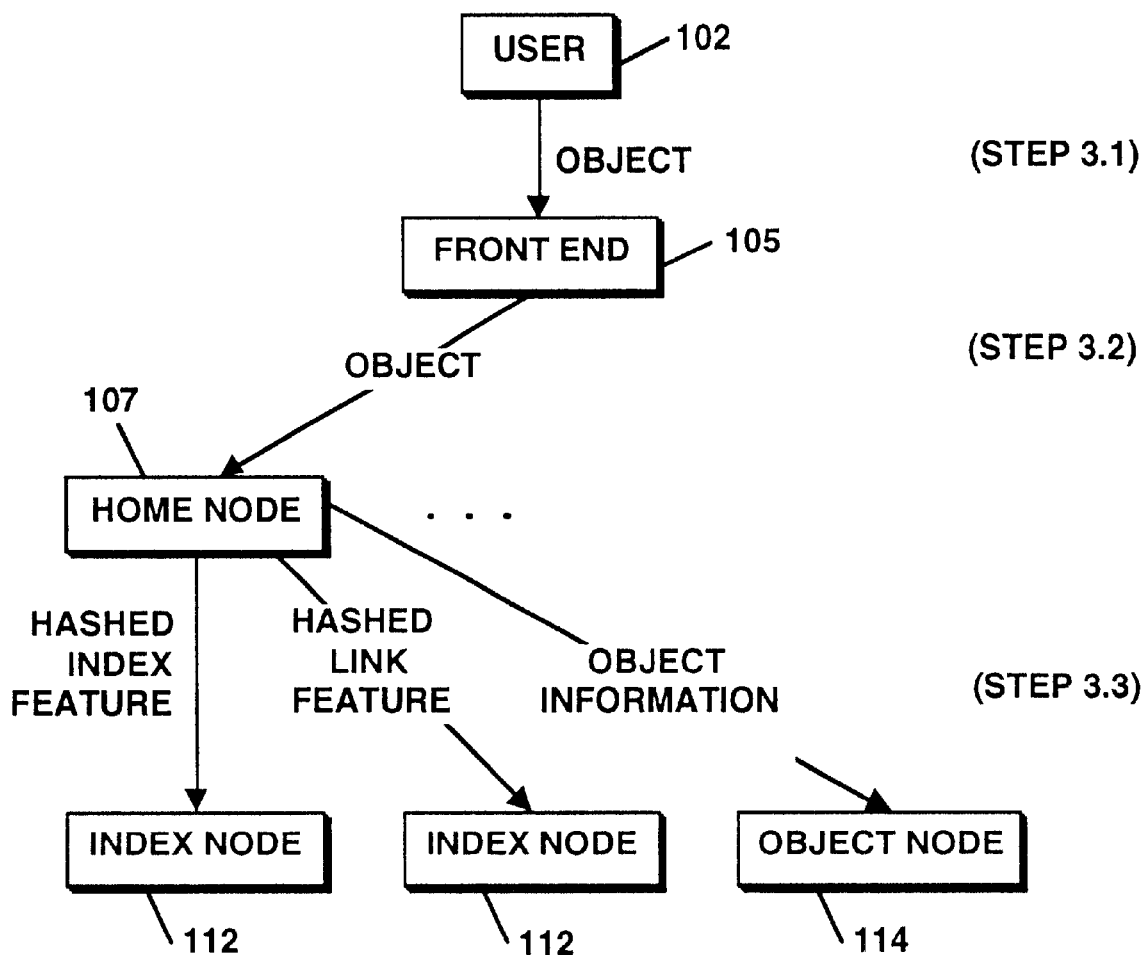
FIG. 3 is a block diagram of the distributed computer database system of FIG. 1 in flow chart form, which illustrates a method for store data associated with a hypertext document in accordance with an embodiment of the invention.

Considering next the indexing of an object, and referring also to FIG. 3, in one embodiment when a user transmits (Step 301) an object from the user computer 102, the front end computer 105 receives the object. The front end computer 105 is responsible for establishing the connection with the user computer 105 to enable the user to transmit an object. In another embodiment the front end computer 105 automatically examines objects in its environment for indexing by the search engine without interaction with a user.

The front end computer 105 selects a home node 107 and transmits the object to the selected home node (Step 302). In one embodiment, the selection of a home node 107 is done randomly so as to evenly distribute the workload among the home nodes. The home node 107 assigns a unique OID to the object, then processes the object as discussed above in the case of elementary queries (Step 303), except that data associated with the object is stored in the index nodes and an object node.

Considering next the message formats used in the preferred embodiment, and refering to FIG. 4a, an exemplary format for an Index Query Message has four fields: Header 402, Elementary Query Identifier (EQID) 403, Hashed Query Fragment (HQF) 404, and Value 405. The Header field 402 specifies that this message is an Index Query Message and also specifies the destination index node. The destination index node is determined by the first portion of the hashed query fragment. The EQID field 403 contains an elementary query type specifier and an elementary query identifier. The HQF field 404 contains a fragment type specifier and the second portion of the hashed query fragment produced by the Hashing Module (FIG. 5). The Value field 405 contains an optional value associated with the fragment. The fragment type specifier determines whether the Index Query Message contains a Value field 405, and if the Index Query Message does contain a Value field then the fragment type specifier determines the size of the Value field.

Referring to FIG. 4b, an exemplary format for an Index Query Response Message contains four fields: Header 406, EQID 407, Object Identifier (OID) 408, and Weight 409. The Header field 406 specifies that this message is an Index Query Response Message and also specifies the destination home node. The destination home node is the home node from which the corresponding Index Query Message was received. The EQID field 407 contains an elementary query type specifier and an elementary query identifier. The OID field 408 contains an object type specifier and an object identifier. The Weight field 409 contains an optional weight associated with the object. The object type specifier determines whether the Index Query Response Message contains a Weight field 409, and if the Index Query Response Message does contain a Weight field then the object type specifier determines the size of the field.

Referring to FIG. 4c, an exemplary format for a Link Query Message has four fields: Header 410, EQID 411, HQF 412 and Value 413. The Header field 410 specifies that this message is a Link Query Message and also specifies the destination index node. The destination index node is determined by the first portion of the hashed query fragment. The EQID field 411 contains an elementary query type specifier and an elementary query identifier. The HQF field 412 contains a fragment type specifier and the second portion of the hashed query fragment produced by the Hashing Module (FIG. 5). The Value field 413 contains an optional value associated with the fragment. The fragment type specifier determines whether the Link Query Message contains a Value field 413, and if the Link Query Message does contain a Value field then the fragment type specifier determines the size of the Value field.

Figure 4D:
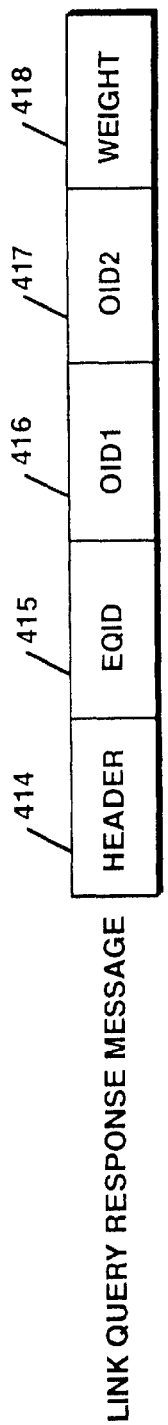
Figure 5:
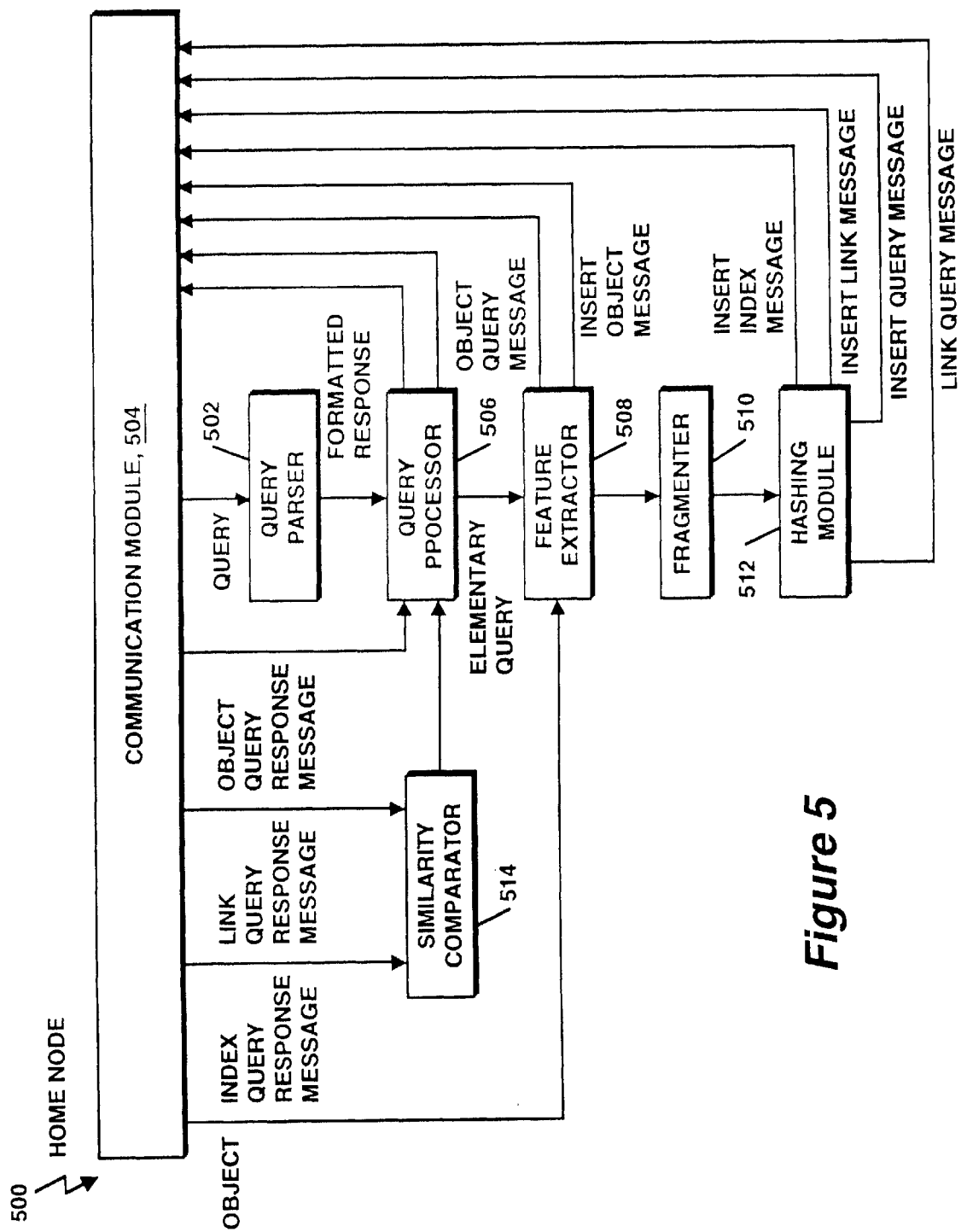
FIG. 5 is a block diagram of a representative one of the home nodes of FIGS. 1, 2, and 3 in accordance with an embodiment of the invention.

Referring to FIG. 4d, an exemplary format for a Link Query Response Message contains five fields: Header 414, EQID 415, OID1 416, OID2 417, and Weight 418. The Header field 414 specifies that this message is an Link Query Response Message and also specifies the destination home node. The destination home node is the home node from which the corresponding Link Query Message was received.

The EQID field 415 contains an elementary query type specifier and an elementary query identifier. The two OID fields 416, 417 contain an object type specifier and an object identifier. The OID1 field 416 contains the OID of the originating (source) object of the link. The OID2 field 417 contains the OID of the destination (target) object of the link. The Weight field 418 contains an optional weight associated with the object. The object type specifier of OID1 determines whether the Link Query Response Message contains a Weight field 418, and if the Link Query Response Message does contain a Weight field then the object type specifier determines the size of the field.

Figure 4E:
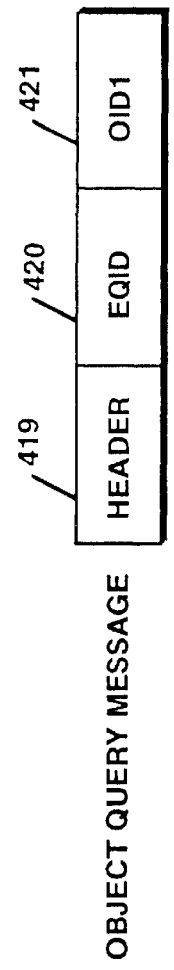

Referring to FIG. 4e, an exemplary format for an Object Query Message has three fields: Header 419, EQID 420, and OID 421. The Header field 419 specifies that this message is an Object Query Message and also specifies the destination object node. The destination object node is determined by the first portion of the object identifier. The EQID field 420 contains an elementary query type specifier and an elementary query identifier. The OID field 421 contains an object type specifier and the second portion of the object identifier.

Figure 4F:
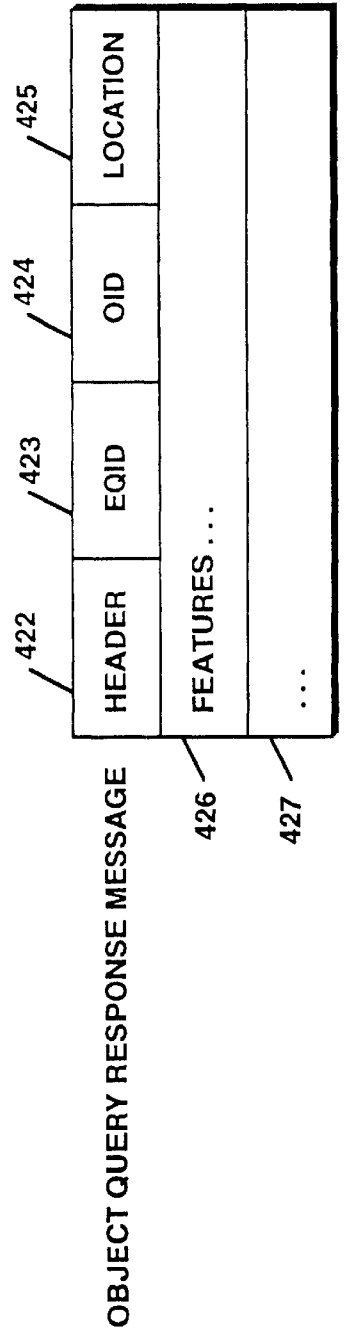

Referring to FIG. 4f, an exemplary format for an Object Query Response Message has three parts: Identifier, Feature and Auxiliary. The Identifier part has four fields: Header 422, EQID 423, OID 424, and Location 425. The Header field 422 specifies that this message is an Object Query Response Message and also specifies the destination home node. The destination home node is the home node from which the corresponding Object Query Message was received. The EQID field 423 contains an elementary query type specifier and an elementary query identifier. The OID field 424 contains an object type specifier and the object identifier. The Location field 425 contains an optional location specifier such as a URL. The object type specifier determines whether the Object Query Response Message contains a Location field 425, and if the Object Query Response Message does contain a Location field, then the object type specifier determines the size of the Location field. The Feature part has a number of fields 426 for containing a number of features associated with the object. The Auxiliary part has a number of fields 427 for containing auxiliary information associated with the object. The object type specifier determines whether the Object Response Message contains an Auxiliary part, and if the Object Response Message does contain an Auxiliary part, then the object type specifier determines the size and structure of the Auxiliary part.

Figure 4G:
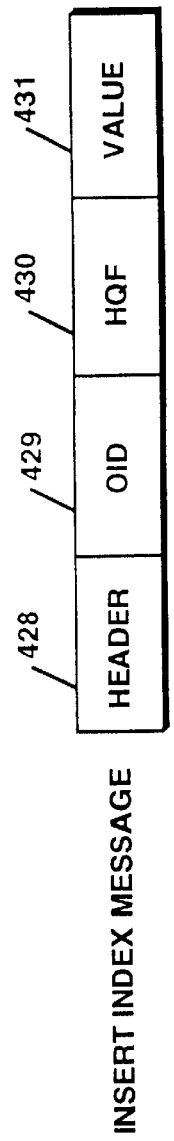

Referring to FIG. 4g, an exemplary format for an Insert Index Message has four fields: Header 428, OID 429, HQF 430, and Value 431. The Header field 428 specifies that this message is an Insert Index Message and also specifies the destination index node. The destination index node is determined by the first portion of the hashed query fragment. The OID field 429 contains an object type specifier and the object identifier. The HQF field 430 contains a fragment type specifier and the second portion of the hashed query fragment produced by the Hashing Module. The Value field 431 contains an optional value associated with the fragment. The fragment type specifier determines whether the Query Message contains a Value field 431, and if the Query Message does contain a Value field then the fragment type specifier determines the size of the Value field.

Figure 4H:
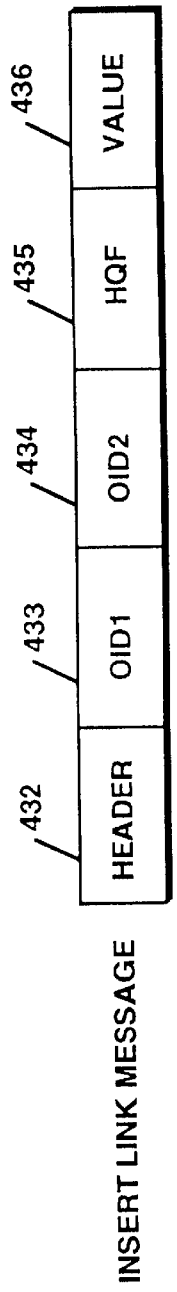

Referring to FIG. 4h, an exemplary format for an Insert Link Message has five fields: Header 432, OID1 433, OID2 434, HQF 435, and Value 436. The Header field 432 specifies that this message is an Insert Link Message and also specifies the destination index node. The destination index node is determined by the first portion of the hashed query fragment. The two OID fields 433, 434 contain an object type specifier and an object identifier. The HQF field 435 contains a fragment type specifier and the second portion of the hashed query fragment produced by the Hashing Module (FIG. 5). The Value field 436 contains an optional value associated with the fragment. The fragment type specifier determines whether the Query Message contains a Value field 436, and if the Query Message does contain a Value field then the fragment type specifier determines the size of the Value field.

Figure 4I:
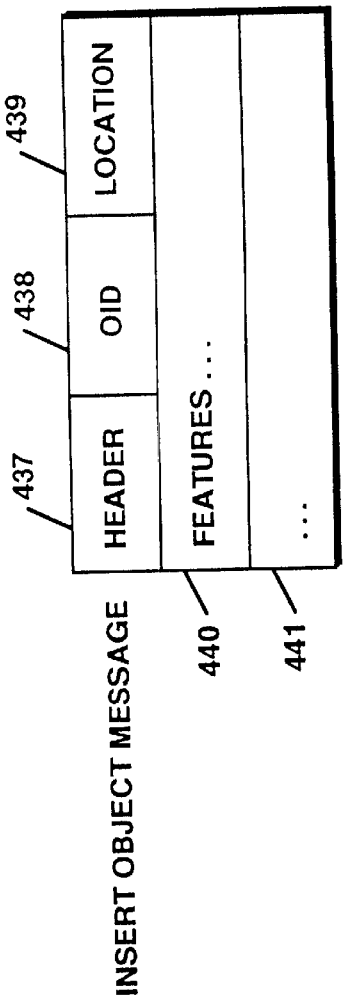

Referring to FIG. 4i, an exemplary format for an Insert Object Message has three parts: Identifier, Feature and Auxiliary. The Identifier part has three fields: Header 437, OID 438, and Location 439. The Header field 437 specifies that this message is an Insert Object Message and also specifies the destination object node. The destination object node is determined by the first portion of the object identifier. The OID field 438 contains an object type specifier and the second portion of the object identifier. The Location field 439 contains an optional location specifier such as a URL. The object type specifier determines whether the Insert Object Message contains a Location field 439, and if the Insert Object Message does contain a Location field, then the object type specifier determines the size of the Location field. The Feature part has a number of fields 440 for containing a number of features associated with the object. The Auxiliary part has a number of fields 441 for containing auxiliary information associated with the object. The object type specifier determines whether the Insert Object Message contains an Auxiliary part, and if the Insert Object Message does contain an Auxiliary part, then the object type specifier determines the size and structure of the Auxiliary part.

Each node o the distributed computer system includes a Communication Module, discussed below and shown in FIGS. 5, 6 and 7 responsible for transmitting and receiving messages from one node to another. Transmission of a message requires (1) enqueuing of the message prior to transmission over the communication medium, (2) actual transmission over the communication medium, and (3) enqueuing a task to process the message when the message is received by the module determined by the message type. The message type determines the command that is issued to the receiving module. The command determines the means by which the message is to be processed by the module. The destination node for a message to be transmitted is specified in the Header field of each message. When a message is received from another node, the type of message determines which module will process the message. The message type is specified in the Header field of each message. The Communication Module of a home node is also responsible for communication with the Front End nodes. A Front End node transmits queries and objects to the home node, and the home node transmits results, such as formatted tables, to the Front End node.

Considering next exemplary embodiments of the nodes discussed above, and also referring to FIG. 5, a home node 500 can have a Query Parser 502 that parses a query received from a communication module 504 into a query computation tree. The nodes of the query computation tree are either internal nodes or leaf nodes. An internal node is a node having one or more child nodes. An internal node specifies how the results of the child nodes are to be combined. A leaf node is a node having no children. A leaf node is either a constant value or an elementary query. Elementary queries are of three kinds: index queries, link queries and object queries. Each elementary query contains a command that determines what action the elementary query is to perform and additional information that depends on the kind of elementary query. An object query contains an OID, and the other two kinds of elementary query contain an information object conforming to the ontology of the object database. A link query contains one link to an unspecified information object. An index query does not contain any unspecified links to other information objects. The query computation tree is transferred to a Query Processor 506.

The Query Processor 506 is responsible for administering the processing of the query. Upon receiving a query computation tree from the Query Parser 502, it assigns a query identifier (QID) to the query, and it assigns an elementary query identifier (EQID) to each leaf node that specifies an elementary query. Each elementary object query is transmitted to an object node using an Object Query Message. The elementary index and link queries are transferred to a Feature Extractor 508. As Query Response Messages are received, the processing specified in the query computation tree is performed. When the entire query has been computed, the response is formatted and transmitted to the front end node from which the query was received.

The Feature Extractor 508 extracts features from an object or elementary query. Feature extraction for images is performed by detecting edges, identifying the image objects, classifying the image objects as domain objects and determining relationships between domain objects. In another embodiment, feature extraction for images is performed by computing Fourier or wavelet transforms from images and sound. Each Fourier or wavelet transform constitutes one extracted feature. Video streams comprise a sequence of images and a synchronized sound track. In addition to feature extraction from the individual images and sound track, video streams can be organized into scenes; domain objects in successive images can be identified with one another and domain objects of the sound track can be related to domain objects in the corresponding scenes. Features extracted from video streams can also include these domain objects. The extracted features are transferred to the Fragmenter 510. In addition, when features have been extracted from an object, the features are transferred to the Communication Module 504 in the form of an Insert Object Message.

The Fragmenter 510 computes the fragments contained in each feature. Each fragment includes a bounded set of related components in the feature. In one embodiment, the fragments of a feature consist of each attribute and each relationship in the data structure defining the feature. The fragments are transferred to a Hashing Module 512.

The Hashing Module 512 computes a hash function of a fragment. In one embodiment, the hash function is the MD4 Message Digest algorithm, as set forth in a specification, Request for Comment (RFC) 1186, published by the Network Working Group of the Internet Engineering Task Force, October, 1990, and available over the Internet or from R. Rivest at the MIT Laboratory for Computer Science, Cambridge, Mass., USA. If the fragment is derived from an elementary index query or an elementary link query, the Hashing Module 512 transmits an Index Query Message or Link Query Message to the Communication Module 504, respectively. If the fragment is derived from an object, then the Hashing Module 512 transmits an Insert Link Message when the fragment includes a link and the Hashing Module 512 transmits an Insert Index Message when the fragment does not include a link.

A Similarity Comparator 514 gathers all the query responses for each elementary query. For each object or link in the responses, the Similarity Comparator 514 determines the relevance of each object or link, respectively, returned in the search. This determination of relevance is made by the home node by comparing the degree of similarity between the elementary query and the objects or links, respectively, whose OIDs or pairs of OIDs, respectively, were received. In one embodiment the measure of similarity between the query and the object is a cosine measure and is given by the expression COS(v,w), where the vector v denotes the query and the vector w denotes the object. These vectors are in a space in which each fragment represents one dimension of the space. The most relevant OIDs or pairs of OIDs, respectively, are transferred to the Query Processor 506.

Figure 6:
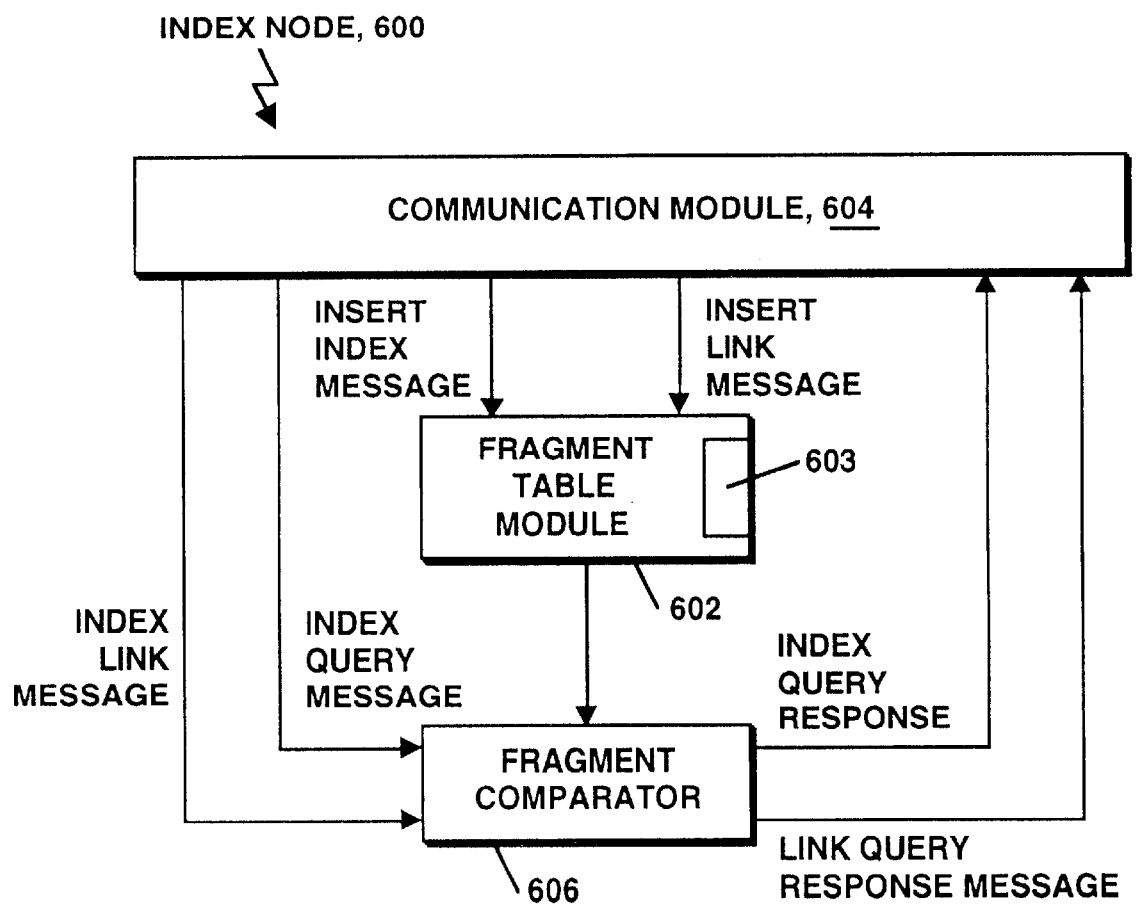
FIG. 6 is a block diagram of a representative one of the index nodes of FIGS. 1, 2 and 3 in accordance with an embodiment of the invention.

Referring to FIG. 6, an index node 600 can have Fragment Table Module 602 that receives Index Query Messages, Index Link Messages, Insert Index Messages and Insert Link Messages from a communication module 604. In the case of an Insert Query Message or an Insert Link Message, the Fragment Table Module 602 retrieves an entry in a local hash table 603 using the hash value in the HQF field. The type specifier in the HQF field and the entry in the local hash table 603 are transferred to a Fragment Comparator 606. In the case of an Insert Index Message or an Insert Link Message, the Fragment Table Module 602 modifies an entry in the local hash table 603 by adding the OID or pair of OID fields, respectively, and the Value field of the Insert Index Message or the Insert Link Message, respectively, to the entry in the local hash table 603.

The Fragment Comparator 606 receives entries from the Fragment Table Module 602. A comparison function is determined by the HQF type specifier that was transferred from the Fragment Table Module 602. The comparison function is used to determine the relevance of the OID and Value fields in the entry that was transferred from the Fragment Table Module 602. In one embodiment, the comparison function determines a similarity weight, and the OIDs having the highest similarity weight are deemed to be relevant. The relevant OIDs and their similarity weights are transferred to the Communication Module 604 using an Index Query Response Message or a Link Query Response Message, depending on whether the entry received from the Fragment Table Module 602 is an index entry or link entry, respectively.

Figure 7:
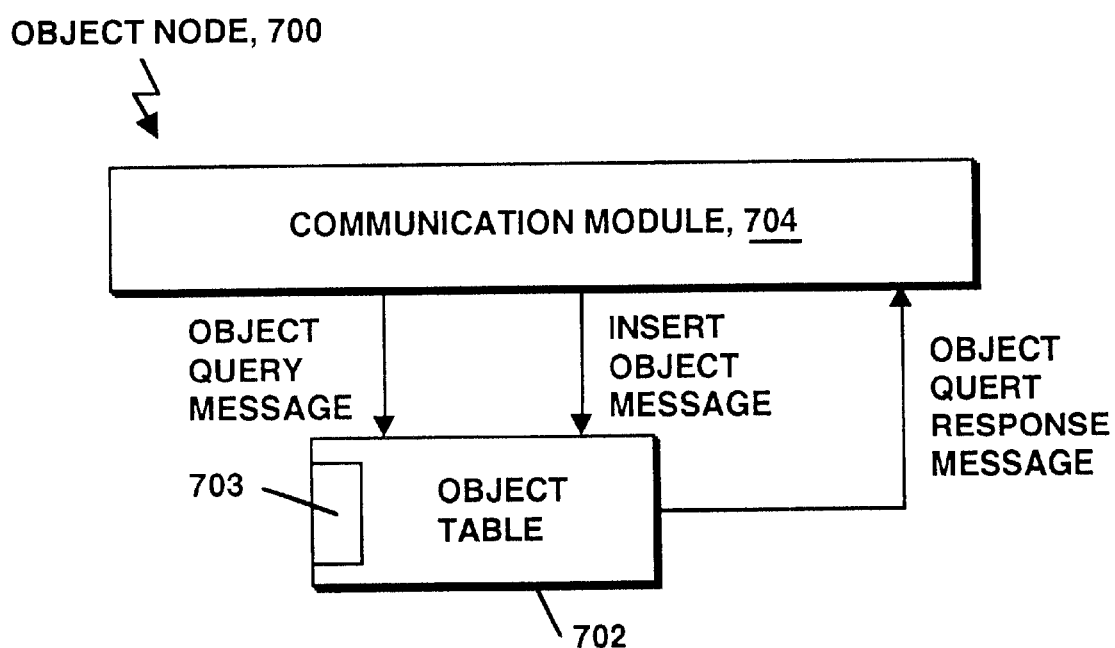
FIG. 7 is a block diagram of a representative one of the object nodes of FIGS. 1, 2, and 3 in accordance with an embodiment of the invention.

Referring to FIG. 7, an object node 700 can have an Object Table Module 702 that receives Object Query Messages and Insert Object Messages from a Communications Module 704. In the case of an Object Query Message, the Object Table Module 702 retrieves an entry in a local table 703 using the object identifier in the OID field of the Object Query Message. The Object Query Message and the retrieved entry are transmitted to the Communication Module 704 using an Object Query Response Message. In the case of an Insert Object Message, the Object Table Module 702 inserts a new entry in the local table 703. If an entry already exists for the specified object identifier, then the existing entry is replaced. The new or replacement entry contains the information in the Insert Object Message.

Figure 8:
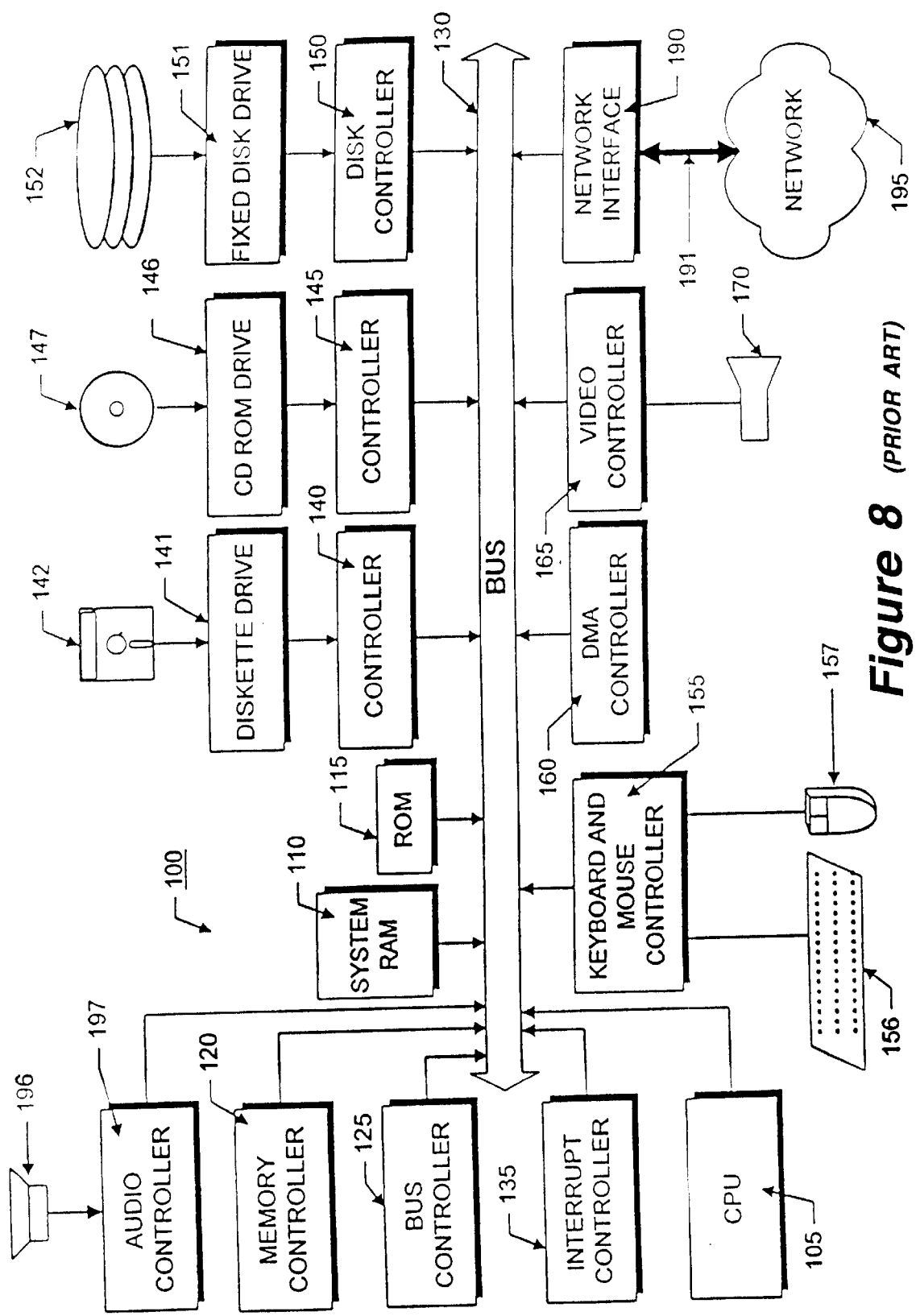
FIG. 8 is a block diagram of a computer system in accordance with an exemplary embodiment of each of the user computer, the front end computer, the home, query, and object nodes, and the external servers.

FIG. 8 illustrates a conventional system architecture for an exemplary computer system 800. Each of the user computer, front end computer and the computer nodes, including the home node, query node, object node, can be implemented as an instance of computer system 800. The exemplary computer system of FIG. 8 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 8.

The computer system 800 includes a central processing unit (CPU) 805, which may include a conventional microprocessor, random access memory (RAM) 810 for temporary storage of information, and read only memory (ROM) 815 for permanent storage of information. A memory controller 820 is provided for controlling system RAM 810. A bus controller 825 is provided for controlling bus 830, and an interrupt controller 835 is used for receiving and processing various interrupt signals from the other system components.

Mass storage may be provided by diskette 842, CD-ROM 847, or hard disk 852. Data and software may be exchanged with client computer 800 via removable media, such as diskette 842 and CD-ROM 847. Diskette 842 is insertable into diskette drive 841, which is connected to bus 830 by controller 840. Similarly, CD-ROM 847 is insertable into CD-ROM drive 846, which is connected to bus 830 by controller 845. Finally, the hard disk 852 is part of a fixed disk drive 851, which is connected to bus 830 by controller 850.

User input to the computer system 800 may be provided by a number of devices. For example, a keyboard 856 and a mouse 857 may be connected to bus 830 by keyboard and mouse controller 855. An audio transducer 896, which may act as both a microphone and a speaker, is connected to bus 830 by audio controller 897. It should be obvious to those reasonably skilled in the art that other input devices, such as a pen and/or tablet and a microphone for voice input, may be connected to client computer 800 through bus 830 and an appropriate controller. DMA controller 860 is provided for performing direct memory access to system RAM 810. A visual display is generated by a video controller 865, which controls video display 870.

Computer system 800 also includes a network adapter 890 that allows the client computer 800 to be interconnected to a network 895 via a bus 891. The network 895, which may be a local area network (LAN), a wide area network (WAN), or the Internet, may utilize general-purpose communication lines that interconnect multiple network devices.

Computer system 800 generally is controlled and coordinated by operating system software. Among other computer system control functions, the operating system controls allocation of system resources and performs tasks such as process scheduling, memory management, networking and I/O services.

A software implementation of components of the above-described embodiment may comprise computer instructions and routines either fixed on a tangible medium, such as a computer-readable media, e.g. the diskette 842, CD-ROM 847, ROM 815, or fixed disk 852 of FIG. 8, or transmittable via a modem or other interface device, such as communications adapter 890 connected to the network 895 over a medium 891. Medium 891 can be either a tangible medium, including but not limited to optical or hard-wire communications lines, or may be implemented with wireless techniques, including but not limited to microwave, infrared or other transmission techniques. It may also be the Internet. When so transmitted, the software components can take the form of a digital signal embodied in a carrier wave. A series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Further, aspects such as the size of memory, the specific configuration of logic and/or instructions utilized to achieve a particular function, as well as other modifications to the inventive concept are intended to be covered by the appended claims. Therefore, the invention should be construed as limited only as indicated by the scope of the claims.

What is claimed is:

1. A method for information retrieval in a distributed computer database system having a plurality of home nodes and a plurality of index nodes connected by a network, said method comprising the steps of:
    A) selecting a first one of said plurality of home nodes;
    B) parsing, by said selected home node, a query conforming to the said query language, from a user, to obtain a plurality of elementary queries;
    C) each of said elementary queries comprising one of an index query or a link query;
    D) extracting, by said selected home node, a plurality of features from each elementary query of the said plurality of elementary queries;
    E) fragmenting each of said extracted elementary query features into elementary query feature fragments;
    F) hashing, by said selected home node, each said elementary query feature fragment of said plurality of elementary query feature fragments, said hashed elementary query feature fragment having a first portion and a second portion;
    G) transmitting, by said selected home node, each said hashed elementary query feature fragment of said plurality of elementary query feature fragments to a respective one of said plurality of index nodes indicated by said first portion of each said hashed elementary query feature fragment;
    H) using by said index node, said second portion of said respective hashed elementary query feature fragment to access data according to a local hash table located on said index node;
    I) returning, by each said index node accessing data according to said respective hashed index query feature fragment a plurality of object identifiers corresponding to said accessed data to said selected home node; and
    J) returning, by each said index node accessing data according to said respective hashed link query feature a plurality of pairs of object identifiers corresponding to said accessed data to said selected home node.

2. The method of claim 1 further comprising the step of receiving, at said home node, said query from said user, prior to the step of parsing said query.

3. The method of claim 2 further comprising the steps of:
    A) determining, by said home node, a measure of similarity between said accessed data and each said elementary query; and
    B) using for subsequent processing, by said home node, accessed data having a degree of similarity determined by the said elementary query, subsequent to the step of returning said plurality of object identifiers or said plurality of pairs of object identifiers, according to said respective hashed index feature fragment or hashed link feature fragment.

4. The method of claim 3 wherein said measure of similarity is determined by a similarity function based on: features possessed by both the said accessed data and the said elementary query; and features possessed only by the said elementary query.

5. A method of storing objects or locations of objects in a manner which is conducive to information retrieval using a query language in a distributed computer database system having a plurality of home nodes and a plurality of index nodes connected by a network, said method comprising the steps of:
    A) selecting a first one of said plurality of home nodes;
    B) extracting, by said selected home node, a plurality of features from an object submitted by a user; each of said plurality of features is either an index feature or a link feature;
    C) fragmenting each said extracted feature into a plurality of object feature fragments;
    D) hashing, by said selected home node, each said object feature fragment of said plurality of object feature fragments, said hashed object feature fragment having a first portion and a second portion;
    E) transmitting, by said selected home node, each said hashed object feature fragment of said plurality of feature fragments to a respective one of said plurality of index nodes indicated by said first portion of each said hashed object feature fragment; and
    F) using, by said index node, said second portion of said respective hashed object feature fragment to store data according to a local hash table located on said index node, said data including the object identifier of the object containing the feature and, in addition, if the feature is a link feature, the object identifier of the object referenced by the link contained in the link feature.

6. The method of claim 5 further comprising the step of receiving, at said home node, said object from said user, prior to the step of extracting features from said object.

7. A distributed computer database system having an information retrieval tool for handling queries from a user comprising:
    A) a plurality of home nodes and a plurality of index nodes, said plurality of home nodes and said plurality of index nodes connected by a network;
    B) wherein each said home node, upon receiving a query from a user, parses the said query to obtain a plurality of elementary queries, each of which is either an index query or a link query, extracts a plurality of features from each said elementary query, fragments each said feature into a plurality of elementary query feature fragments; hashes each said elementary query feature fragment of said plurality of query feature fragments into a hashed elementary query feature fragment having a first portion and a second portion, and transmits each said hashed query feature fragment to a respective one of said plurality of index nodes indicated by said first portion of said hashed elementary query feature fragment, and C) further wherein each said index node uses said second portion of said hashed query feature fragment to access data according to a local hash table located on said index node and returns a plurality of object identifiers or a plurality of pairs of object identifiers, corresponding to said accessed data to said home node.

8. The distributed computer database system of claim 7 wherein said home node determines a measure of similarity between said accessed data and said elementary query and returns to said user, or uses for subsequent processing, accessed data having a predetermined degree of similarity.

9. The method of claim 8 wherein said home node measures similarity using a similarity function determined by: features possessed by both the said accessed data and the said elementary query; and features possessed only by the said elementary query.

10. A distributed computer database system for storage and retrieval of information objects or locations of information objects, comprising A) a plurality of home nodes and a plurality of index nodes, said plurality of home nodes and said plurality of index nodes connected by a network;

B) wherein each said home node, upon receiving an object from a user, extracts a plurality of features from said object, each feature of said plurality of object features being either an index feature or a link feature, fragments each said object feature into a plurality of object feature fragments; hashes each said object feature fragment of said plurality of object feature fragments into a hashed object feature fragment having a first portion and a second portion, and transmits each said hashed object feature fragment to a respective one of said plurality of index nodes indicated by said first portion of said hashed object feature fragment, and C) further wherein each said index node uses said second portion of said hashed object feature fragment to store object identifiers according to a local hash table located on said index node.

11. A distributed computer database system having an information retrieval tool for handling queries from a user, comprising:

A) a plurality of home nodes, and a plurality of index nodes, said plurality of home nodes and said plurality of index nodes connected by a network;

B) each said home node, upon receiving a command from a user, enqueuing a predetermined task in response to said command, C) a query task enqueued being resultant in, in response to a query command from said user, parsing the said query into a plurality of elementary queries, each of said elementary queries being either an index query or a link query, extracting a plurality of features from each said elementary query of said plurality of elementary queries parsed from the said query contained in said query command, fragmenting each said elementary query feature into a plurality of elementary query feature fragments; hashing each said elementary query feature fragment of said plurality of elementary query feature fragments into a hashed elementary query feature fragment having a first portion and a second portion, and transmitting an elementary query message containing each said hashed elementary query feature fragment to a respective one of said plurality of index nodes indicated by said first portion of said hashed elementary query feature fragment, and D) said index node, upon receipt of said elementary query message, using said second portion of said hashed elementary query feature to access data according to a local hash table located on said index node and transmitting a message returning a plurality of object identifiers, if the said elementary query feature fragment is an index feature fragment, or returning a plurality of pairs of object identifiers, if the said elementary query feature fragment is a link feature fragment, corresponding to said accessed data to said home node.

12. A distributed computer database system for storage and retrieval of information, comprising:

A) a plurality of home nodes and a plurality of index nodes, said plurality of home nodes and said plurality of index nodes connected by a network;

B) each said home node, upon receiving a command from a user, enqueuing a predetermined task in response to said command, C) an insert task enqueued, in response to an insert command from said user, extracting a plurality of features from an object contained in said insert command, each said feature of said plurality of features being either an index feature or a link feature, fragmenting each said object feature into a plurality of object feature fragments; hashing each said object feature fragment of said plurality of object feature fragments into a hashed object feature fragment having a first portion and a second portion, and transmitting an insert message containing each said hashed object feature fragment to a respective one of said plurality of index nodes indicated by said first portion of said hashed object feature fragment, and D) said index node, upon receipt of said insert message, using said second portion of said hashed object feature fragment to store data according to a local hash table located on said index node, said data consisting of the object identifier of the object containing the feature and, in addition, if the feature fragment is a link feature fragment, the object identifier of the object referenced by the link contained in the link feature fragment.

13. A computer program product for processing a query for word based and non-word based retrieval of information from a database, the computer program product comprising a computer-executable program embodied on a computer-readable medium, the computer-executable program comprising:

A) a first code portion for extracting a number of features from each of a number of elementary queries comprising a link query;

B) a second code portion for fragmenting each of the features into feature fragments;

C) a third code portion for hashing each of the feature fragments into hashed feature fragments; and D) a fourth code portion for using each of the feature fragments in accessing a corresponding hash table for obtaining an object identifier therefrom for use in obtaining information from the database relevant to the link queries.

14. The computer program product of claim 13, wherein the first code portion can extract a number of features from each of a number of elementary queries, each of the elementary queries comprising one of an index query and a link query; and wherein the fourth code portion can use each of the feature fragments in accessing a corresponding hash table for obtaining an object identifier therefrom for use in obtaining information from the database relevant to the elementary queries, including index information relevant to the index queries and link information relevant to the link queries.

15. The computer program product of claim 14, further comprising a fifth code portion for parsing a query into a plurality of elementary queries each including one of an index query and a link query.

16. A computerized information retrieval system for processing a query for word based and non-word based retrieval of information from a database, the information retrieval system comprising:
   A) a first mechanism for extracting a number of features from each of a number of elementary queries, each of the elementary queries comprising a link feature;
   B) a second mechanism coupled with the first mechanism for fragmenting each of the features into feature fragments;
   C) a third mechanism coupled with the second mechanism for hashing each of the feature fragments into hashed feature fragments; and
   D) a fourth mechanism coupled with the third mechanism for using each of the hashed feature fragment in accessing a corresponding hash table for obtaining an object identifier therefrom for use in obtaining information from the database relevant to the link queries.

17. The information retrieval system of claim 16, wherein the first mechanism can extract a number of features from each of a number elementary queries, each of the elementary queries comprising one of an index query and a link query; and wherein the fourth code portion can use each of the feature fragments in accessing a corresponding hash table for obtaining an object identifier therefrom for use in obtaining information from the database relevant to the elementary queries, including index information relevant to the index queries and link information relevant to the link queries.

18. The system of claim 17, further comprising a fifth mechanism for parsing a query into a plurality of elementary queries each including one of an index query and a link query.

19. A method for processing a query for word based and non-word based retrieval of information from a database, the method comprising:
   A) extracting a number of features from each of a number of elementary queries, each of the elementary queries comprising a link query;
   B) fragmenting each of the features into feature fragments;
   C) hashing each of the feature fragments into hashed feature fragments; and
   D) using each of the feature fragments in accessing a corresponding hash table for obtaining an object identifier therefrom for use in obtaining information from the database relevant to the link queries.

20. The information retrieval system of claim 19, wherein each of the elementary queries comprises one of an index query and a link query; and wherein the using step comprises the step of using each of the feature fragments in accessing a corresponding hash table for obtaining an object identifier therefrom for use in obtaining information from the database relevant to the elementary queries, including index information relevant to the index queries and link information relevant to the link queries.

21. The information retrieval system of claim 20, further comprising a fifth mechanism for parsing a query into a plurality of elementary queries each including one of an index query and a link query.

22. An information indexing system for indexing information for facilitated retrieval from a database, the system comprising:
   A) a first mechanism for extracting a number of features from an information object, each of the features comprising a link feature;
   B) a second mechanism coupled with the first mechanism for fragmenting each of the features into feature fragments;
   C) a third mechanism coupled with the second mechanism for hashing each of the feature fragments into hashed feature fragments; and
   D) a fourth mechanism coupled with the third mechanism for using each of the feature fragments in accessing a corresponding hash table that identifies a location at which data is to be stored, the data including an object identifier of an object referenced by a link specified by the link feature.

23. The information indexing system of claim 22, wherein each of the features comprises one of an index feature and a link feature; and the fourth mechanism can use each of the feature fragments in accessing a corresponding hash table that identifies a location at which data is to be stored, the data including (i) an object identifier if the feature comprises an object feature, and (ii) an object identifier of an object referenced by a link specified by the link feature if the feature comprises a link feature.

24. The information indexing system of claim 22, further comprising a fifth mechanism for parsing a query into a plurality of elementary queries each including one of an index query and a link query.

25. A computer program product for indexing information for facilitated retrieval from a database, the computer program product comprising a computer-executable program embodied on a computer-readable medium, the computer-executable program comprising:
   A) a first code portion for extracting a number of features from an information object, each of the features comprising a link feature;
   B) a second code portion for fragmenting each of the features into feature fragments;
   C) a third code portion for hashing each of the feature fragments into hashed feature fragments; and
   D) a fourth code portion for using each of the feature fragments in accessing a corresponding hash table that identifies a location at which data is to be stored, the data including an object identifier of an object referenced by a link specified by the link feature.

26. The computer program product of claim 25, wherein each of the features comprises one of an index feature and an link feature; and wherein the fourth code portion can use each of the feature fragments in accessing a corresponding hash table that identifies a location at which data is to be stored, the data including (i) an object identifier if the feature comprises an link feature, and (ii) an object identifier of an object referenced by a link specified by the link feature if the feature comprises a link feature.

27. The computer program product of claim 26, further comprising a fifth code portion for parsing a query into a plurality of elementary queries each including one of an index query comprising a number of the index features and a link query comprising a number of the link features.

28. A method for indexing information for facilitated retrieval from a database, the method comprising:
   A) extracting a number of features from an information object, each of the features comprising a link feature;
   B) fragmenting each of the features into feature fragments;
   C) hashing each of the feature fragments into hashed feature fragments; and
   D) using each of the feature fragments in accessing a corresponding hash table that identifies a location at which data is to be stored, the data comprising an object identifier of an object referenced by a link specified by the link feature.

29. The method of claim 28, wherein each of the features comprises one of an index feature and a link feature; and wherein using step includes the step of using each of the feature fragments in accessing a corresponding hash table that identifies a location at which data is to be stored, the data including (i) an object identifier if the feature comprises an index feature, and (ii) an object identifier of an object referenced by a link specified by the link feature if the feature comprises a link feature.

30. The method of claim 29, further comprising parsing a query into a plurality of elementary queries each including one of an index query comprising a number of the index features and a link query comprising a number of the link features.

* * * * *